United States Patent
Kitzmann et al.

(10) Patent No.: US 9,677,429 B2
(45) Date of Patent: Jun. 13, 2017

(54) STEAM POWER PLANT WITH HIGH-TEMPERATURE HEAT RESERVOIR

(71) Applicant: ALSTOM Technology, Ltd., Baden (CH)

(72) Inventors: Ewald Kitzmann, Weinheim (DE); Volker Schüle, Leimen (DE); Julia Heintz, Gernsheim (DE); Angie Ewert, Mannheim (DE)

(73) Assignee: GENERAL ELECTRIC TECHNOLOGY GMBH, Baden (CH)

(*) Notice: Subject to any disclaimer, the term of this patent is extended or adjusted under 35 U.S.C. 154(b) by 381 days.

(21) Appl. No.: 13/668,222

(22) Filed: Nov. 3, 2012

(65) Prior Publication Data

US 2013/0298559 A1    Nov. 14, 2013

(30) Foreign Application Priority Data

Nov. 3, 2011    (EP) .................................... 11187636

(51) Int. Cl.
*F01K 13/02*    (2006.01)
*F01K 23/10*    (2006.01)
(Continued)

(52) U.S. Cl.
CPC ............... *F01K 3/00* (2013.01); *F01K 3/004* (2013.01); *F01K 3/16* (2013.01); *F01K 7/22* (2013.01);
(Continued)

(58) Field of Classification Search
CPC ... F01K 7/22; F01K 7/325; F01K 7/34; F01K 7/40; F01K 13/00; F01K 13/02;
(Continued)

(56) References Cited

U.S. PATENT DOCUMENTS 3,411,300 A * 11/1968 Schuetzenduebel et al. ............................ 122/406.4
3,979,914 A *  9/1976 Weber ..................... F22G 1/005
                                                376/402
(Continued)

FOREIGN PATENT DOCUMENTS

DE    102009060911 A1    7/2011
EP       2 333 254 A1    6/2011
(Continued)

OTHER PUBLICATIONS

Extended European Search Report, European Patent Application No. 11187644, Alstom Technology, Ltd., Mar. 20, 2012.

*Primary Examiner* — Mark A Laurenzi
*Assistant Examiner* — Wesley Harris
(74) *Attorney, Agent, or Firm* — Marc A. Vivenzio; GE Global Patent Operation (57) ABSTRACT

A steam power plant is suggested having, parallel to the high-pressure preheater passage (VW4 to VW6), a heat reservoir (A) which is loaded with preheated condensate in weak-load times. This preheated condensate is taken from the heat reservoir (A) for generating peak-load and inserted downstream of the high-pressure preheater passage (VW4 to VW6) into the condensate line (19.2) resp. the feed water container (8). Thus it is possible to quickly control the power generation of the power plant in a wide range without significantly having to change the heating output of the boiler of the steam generator (1). A steam power plant equipped according to the invention can thus be operated with bigger load modifications and also provide more control energy.

14 Claims, 9 Drawing Sheets

(51) Int. Cl.

| | | |
|---|---|---|
| *F01K 25/08* | (2006.01) | |
| *F01K 7/22* | (2006.01) | |
| *F01K 13/00* | (2006.01) | |
| *F01K 7/40* | (2006.01) | |
| *F02C 6/18* | (2006.01) | |
| *F24J 2/07* | (2006.01) | |
| *F24J 2/42* | (2006.01) | |
| *F03G 6/06* | (2006.01) | |
| *F22B 1/00* | (2006.01) | |
| *F22B 1/18* | (2006.01) | |
| *F01K 7/42* | (2006.01) | |
| *F01K 7/44* | (2006.01) | |
| *F01K 3/00* | (2006.01) | |
| *F03G 7/04* | (2006.01) | |
| *F01K 3/16* | (2006.01) | |

(52) U.S. Cl.
CPC .............. *F01K 7/40* (2013.01); *F01K 7/42* (2013.01); *F01K 7/44* (2013.01); *F01K 13/00* (2013.01); *F01K 13/02* (2013.01); *F01K 23/10* (2013.01); *F01K 23/101* (2013.01); *F01K 23/106* (2013.01); *F01K 25/08* (2013.01); *F02C 6/18* (2013.01); *F03G 6/065* (2013.01); *F03G 7/04* (2013.01); *F22B 1/006* (2013.01); *F22B 1/1815* (2013.01); *F24J 2/07* (2013.01); *F24J 2/42* (2013.01); *Y02E 10/14* (2013.01); *Y02E 10/16* (2013.01); *Y02E 10/46* (2013.01); *Y02P 20/129* (2015.11)

(58) Field of Classification Search
CPC .......... F01K 13/003; F01K 3/12; F01K 23/10; F01K 23/106; F01K 25/08; F01K 23/101; F01K 7/42; F01K 7/44; F03G 6/003; F03G 7/04; F03G 6/065; F22B 29/00; F22B 29/06; F22B 29/10; F22B 29/12; F22B 35/105; F22B 1/006; F22B 1/1815; F22D 1/12; F22D 1/32; F22D 1/325; F28D 2020/0047; F28D 2020/006; Y02E 10/46; Y02E 20/16; Y02E 20/14; Y02P 20/129; F02C 6/18; F24J 2/07; F24J 2/42
USPC ...... 60/641.8, 645, 646, 648, 652, 659, 667, 60/670, 653, 654, 677–680; 122/406.4, 122/412
See application file for complete search history.

(56) References Cited

U.S. PATENT DOCUMENTS

| | | | | |
|---|---|---|---|---|
| 4,003,786 A | | 1/1977 | Cahn | |
| 4,080,789 A | * | 3/1978 | Frei ........................ | 60/667 |
| 4,164,848 A | * | 8/1979 | Gilli et al. .............. | 60/652 |
| 4,171,617 A | * | 10/1979 | Sakamoto et al. ..... | 60/641.8 |
| 4,290,389 A | * | 9/1981 | Palchik .................. | 122/406.4 |
| 4,430,962 A | * | 2/1984 | Miszak .................. | 60/652 |
| 4,651,533 A | * | 3/1987 | Ura et al. ............... | 60/646 |
| 5,675,970 A | * | 10/1997 | Yamada et al. ........ | 60/670 |
| 2004/0105518 A1 | * | 6/2004 | Abel ...................... | F01K 7/40 376/210 |
| 2004/0129002 A1 | * | 7/2004 | Huengerle .............. | F01K 17/025 60/772 |
| 2012/0216540 A1 | * | 8/2012 | Stoever ................. | B01D 53/1475 60/653 |

FOREIGN PATENT DOCUMENTS

| | | | |
|---|---|---|---|
| GB | 896194 A * | 5/1962 | ............ F01K 3/04 |
| WO | 2011015185 A2 | 2/2011 | |
| WO | 2011057881 A1 | 5/2011 | |

* cited by examiner

STEAM POWER PLANT WITH HIGH-TEMPERATURE HEAT RESERVOIR

CROSS REFERENCE TO RELATED APPLICATIONS

This application claims the benefit of European Patent Application No.: 11187636.3, filed on Nov. 3, 2011, which is incorporated herein by reference in its entirety.

SPECIFICATION

Conventional steam power plant plants have a closed water-steam cycle. In the steam generator so much energy is added to the steam generator feed water by combustion of a fossil fuel that it passes into the vaporous aggregate condition. This steam drives a generator via one or several steam turbines and afterwards is liquefied again in a condenser.

As it is not possible to economically store electric energy in big scope, there were already considerations in the past aiming at storing thermal energy in a steam power plant in order to thereby increase the flexibility resp. adaptation to grid requirements (peak load).

From EP 1 2 333 254 A1 of the applicant a steam power plant is known comprising a steam generator, a turbine, a condenser, a condensate line and at least one low temperature preheater and a heat reservoir, wherein the condensate line connects the condenser, the at least one preheater and a feed water container with each other and wherein the heat reservoir is arranged parallel to the at least one preheater and the heat reservoir is loaded with condensate which was preheated by at least one preheater.

Thus it is possible to branch off condensate to some extent and to temporarily store it in the heat reservoir in the weak load times so that the output of the steam generator can be maintained, even if the generated electric output of the power plant is considerably reduced. In these weak load times it is easily possible to branch off much tapping steam from the steam turbine and to preheat more condensate as is actually required.

When the load now increases considerably, then it is possible to convey the condensate stored in the heat reservoir and being already preheated directly into the feed water container under circumvention of the preheaters.

From U.S. Pat. No. 4,003,786 a steam power plant is known that uses a high temperature heat reservoir and a lower temperature heat reservoir to extract thermal energy from the steam-water circuit of a steam power plant in times of low electricity demand. In times of high electricity demand the thermal energy stored in the high temperature heat reservoir is re-fed into the steam-water circuit of a steam power plant to increase the output of electric energy. This system is very costly and difficult to operate.

The known arrangements partially need additional electric energy. Some of them store thermal energy at a rather low temperature level (<180° C.).

ADVANTAGES OF THE INVENTION

The invention describes a steam power plant that allows to store thermal energy at a high temperature level in times of electric light load. Wherein in times of increased electric demand the stored thermal energy can be used to generate additional electric energy or to save coal.

The invention is suited especially well for the following applications:

Reducing the electric output of the power plant during times with high grid load by means of regenerative energies (especially wind and sun);
Providing and generating of regulation energy;
Providing overload capacities;
Smoothing the load curve (balancing of minimums and peaks).

The invention uses a high temperature energy or heat reservoir of any known configuration. The heat reservoir can e. g. be a concrete reservoir as in DE 10 2009 060 911 A1, however other heat reservoirs with operating temperatures above 180° C. are also conceivable. To generalize the operating temperature of the heat reservoir should be higher than the temperature of the feed water after having passed the fed water container.

Further advantages and advantageous embodiments of the invention can be taken from the following drawing, its specification and the patent claims. All features described in the drawing, its specification and the patent claims can be relevant for the invention either taken by themselves or in optional combination with each other.

FIGURES

FIG. 1 A block diagram of a conventional steam power plant,
FIG. 2 a first embodiment of the claimed invention,
FIG. 3 the first embodiment during loading of the heat reservoir in a first mode of operation,
FIG. 4 the first embodiment during loading in a second mode of operation,
FIG. 5 the first embodiment during unloading,
FIG. 6 a diagram illustrating the first claimed method of unloading the heat reservoir,
FIG. 7 a second embodiment of the claimed invention,
FIG. 8 the second embodiment during loading of the heat reservoir and
FIG. 9 the first embodiment during unloading.

DESCRIPTION OF THE EMBODIMENTS

Figure 1:
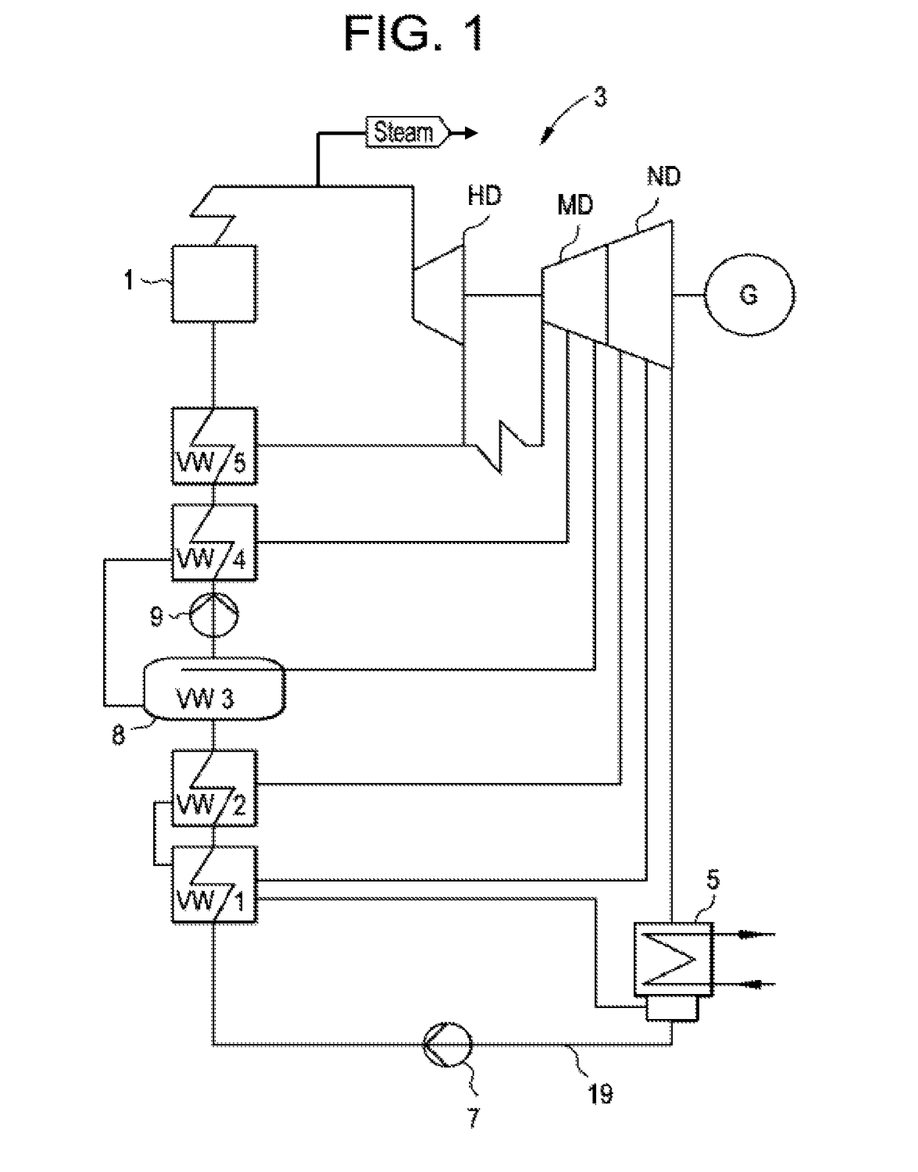

In FIG. 1 a conventional steam power plant fuelled with fossils or biomass is represented as block diagram. FIG. 1 essentially has the purpose of designating the single components of the power plant and to represent the water-steam-cycle in its entirety. For reasons of clarity in the following figures only those parts of the water-steam-cycle are represented which are essential to the invention.

In a steam generator 1 under utilization of fossil fuels or by means of biomass out of the feed water live steam is generated, which is expanded in a steam turbine 3 and thus drives a generator G. Turbine 3 can be separated into a high-pressure part HD, a medium-pressure part MD and a low-pressure part ND.

After expanding the steam in turbine 3, it streams into a condenser 5 and is liquefied there. For this purpose a generally liquid cooling medium, as e. g. cooling water, is supplied to condenser 5. This cooling water is then cooled in a cooling tower (not shown) or by a river in the vicinity of the power plant (not shown), before it enters into condenser 5.

The condensate originated in condenser 5 is then supplied, by a condensate pump 7, to several preheaters $VW_i$, with i=1 . . . n. In the shown embodiment behind the second preheater VW2 a feed water container 8 is arranged. Behind the feed water container 8 a feed water pump 9 is provided.

In combination with the invention it is of significance that the condensate from condenser 5 is preheated with steam beginning with the first preheater VW1 until the last preheater VW5. The tapping steam is taken from turbine 3 and leads to a diminution of the output of turbine 3. With the heat exchange between tapping steam and condensate the temperature of the condensate increases from preheater to preheater. Consequently the temperature as well of the steam utilized for preheating must increase from preheater to preheater.

In the shown embodiment the preheaters VW1 and VW2 are heated with steam from low-pressure part ND of steam turbine 3, whereas the last preheater VW5 is partially heated with steam from the high-pressure part HD of steam turbine 3. The third preheater VW3 arranged in the feed water container 8 is heated with steam from the medium-pressure part MD of turbine 3.

Figure 2:
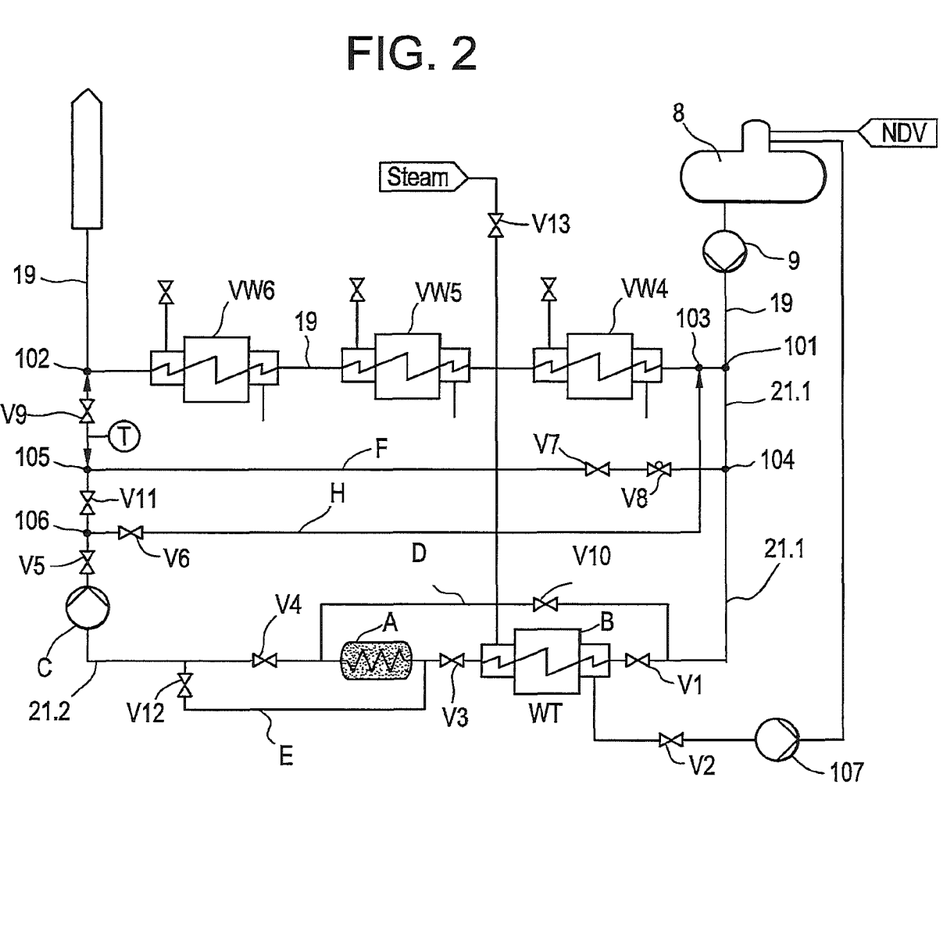
Figure 3:
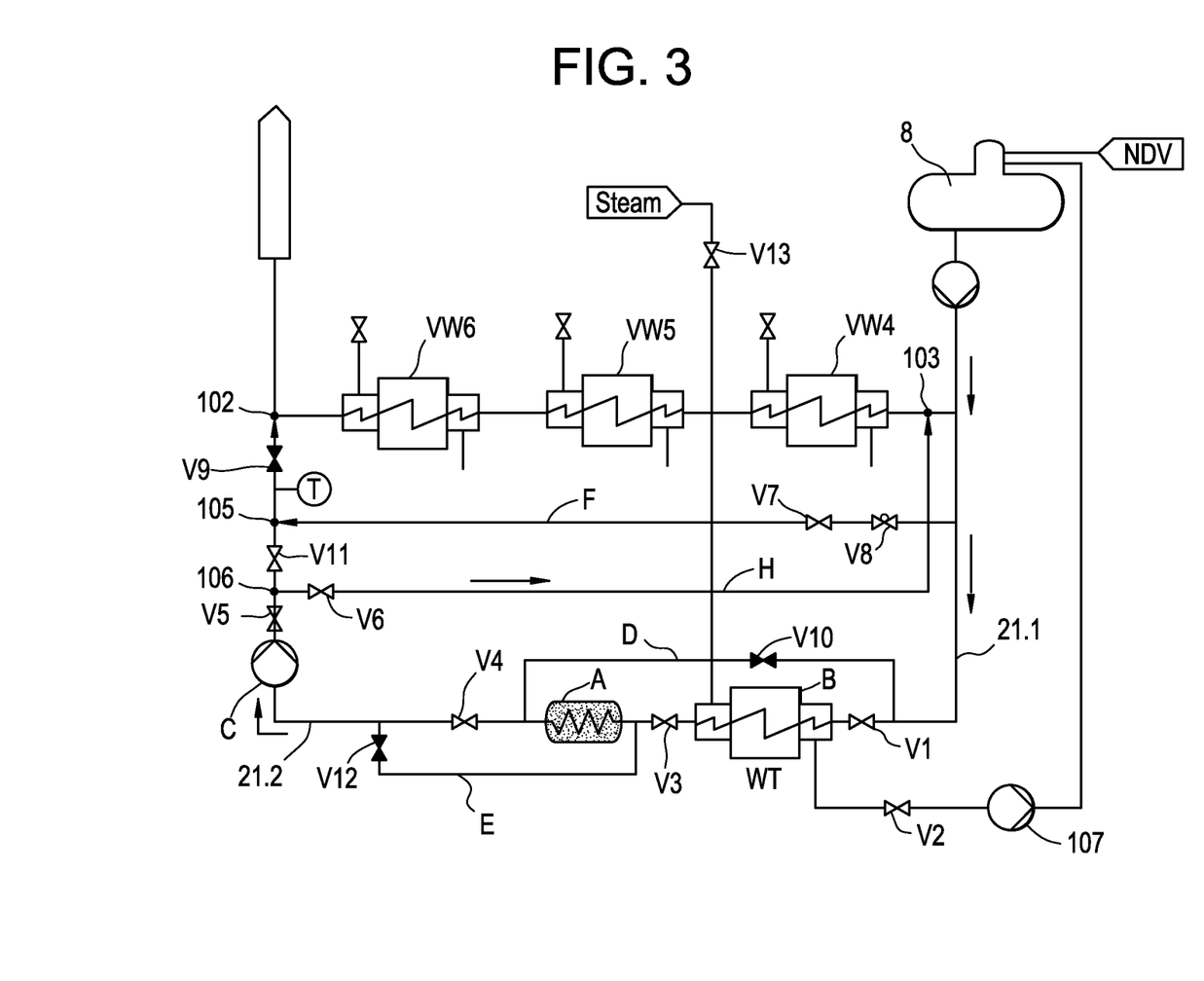
Figure 4:
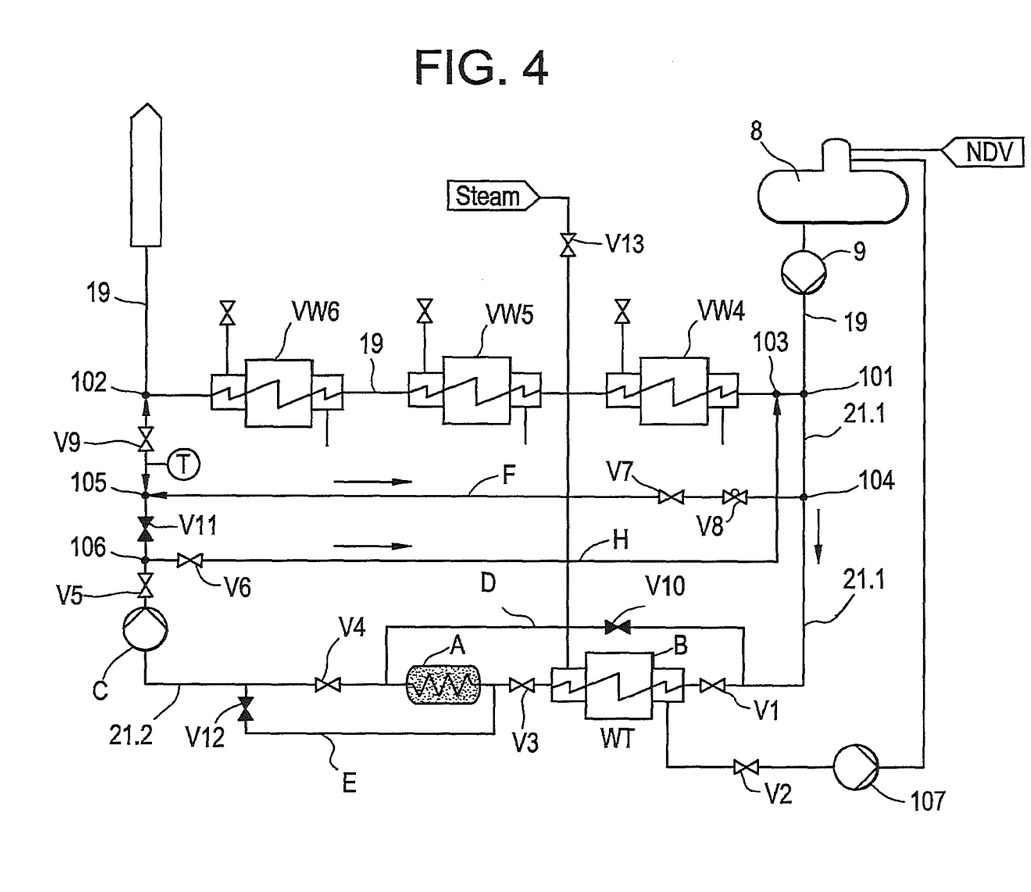
Figure 5:
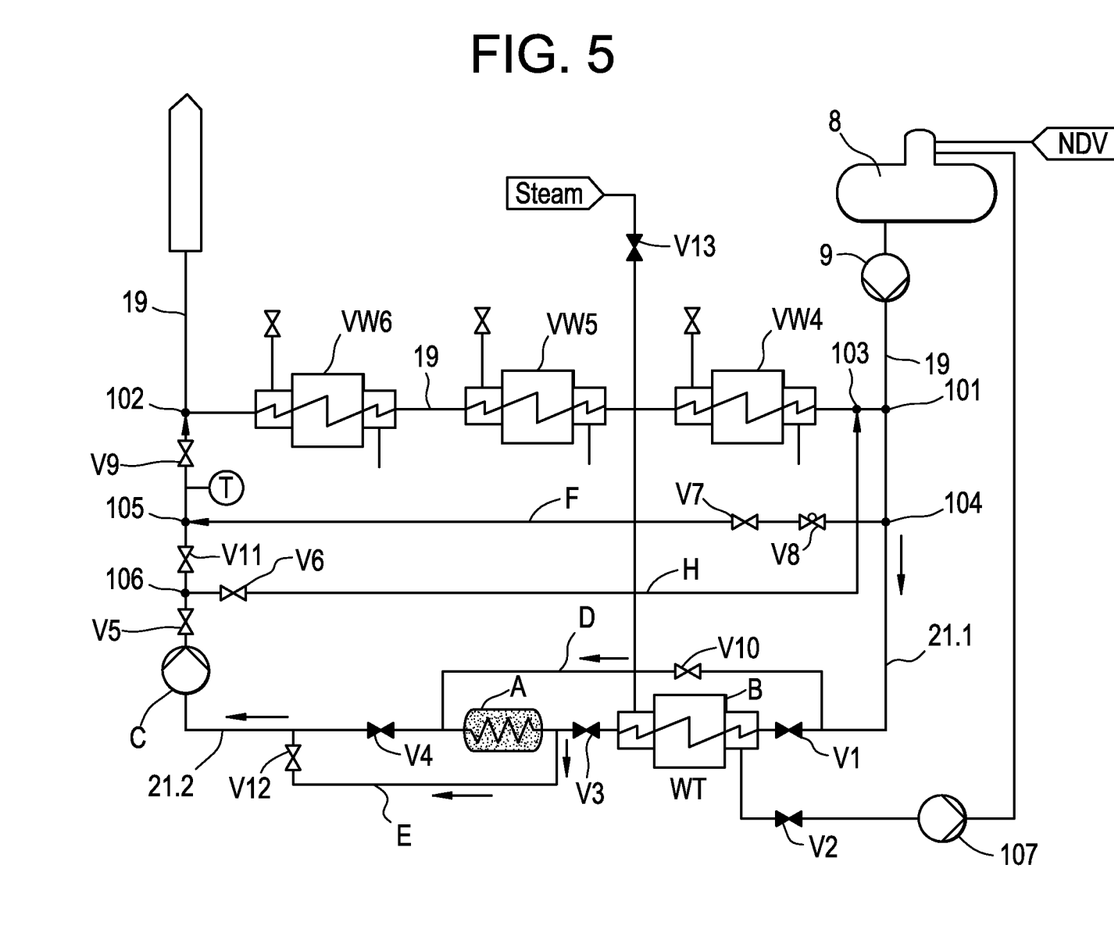

In FIG. 2 a first embodiment of a steam power plant according to the invention is shown. In FIGS. 3 to 5 various operation conditions of the first embodiment are shown.

As the invention essentially is concerned with the section of the steam power plant between feed water container 8 and steam generator 1, only this part of the steam power plant is shown in FIG. 2 ff. Neither are, for reasons of clarity, all fittings and components in FIG. 2 ff. designated with reference numerals. The designation of the fittings and representation of the fittings and components corresponds to DIN 2482 "Graphic symbols for heat diagrams", which herewith is referred to, and are thus self-explanatory.

Where obviously identical connections are present several times, partially the insertion of reference numerals is dispensed with in order to maintain the clarity of the figures.

Parallel to the high-pressure-preheaters VW 4 to VW6 a mixing conduit F is installed. It is connected to the first section 21.1 of the connecting line 21 at the first mixing point 104 and connected to the second section 21.2 of the connecting line 21 at the second mixing point 105.

Parallel to the high-pressure-preheaters VW 4 to VW6 a heat reservoir A is installed in the water-steam-cycle. In line with the heat reservoir A a first heat exchanger B and a pump C are installed. The first heat exchanger B may be a condensation-heat exchanger with desuperheater and subcooler. The first heat exchanger B is supplied with live steam from the Steam generator 1 (c. f. FIG. e1) and not with tapping steam from the turbine 3. In other words the hot steam is tapped from the water-steam-cycle, e. g. between steam separator/drum, which is inside the steam generator 1 and before entry into the high-pressure turbine HD.

The heating steam is connected to the desuperheater of the first heat exchanger B. The condensate of the heating steam is tapped from the subcooler and at an adequate location (temperature) re-fed into the water-steam-cycle. The condensate can also be discharged into the condenser 5. A valve V is arranged in the condensate discharge. A second pump 107 can also be situated in the condensate discharge.

Around the heat exchanger B and the heat reservoir A a first bypass D is installed. A second bypass E is installed around the heat reservoir A, making it possible to pump hot water through the heat reservoir A in the other direction with the same pump C.

The heat reservoir A and the first heat exchanger B are connected to the condensate line 19 by means of a connecting line 21. heat. A first section 21.1 of the connecting line 21 is connected to the condensate line 19 at a cold water connection 101 between feed water outlet of the feed water container 8 and the first high-pressure preheater VW4.

A second section 21.2 of the connecting line 21 is connected to the condensate line 19 at a primary hot water connection 102 behind the last high-pressure preheater VW6 and before the steam generator 1 or an economiser.

A secondary hot water connection 103 is arranged before the first high-pressure preheater VW4 but behind the cold water connection 101.

The valves required by the process have a reference numeral beginning with. "V" as an abbreviation for "Valve" and a number. An open valve is shown as a contour, whereas a closed Valve is shown as a black area inside the contour. In FIG. 2 all valves are shown open.

The cold water connection 101 is associated with the heat reservoir A via the first heat exchanger B by means of the connecting line 21. The outlet of the heat reservoir A is connected with a mixing point 105 as well as the primary hot water connection 102 and the secondary hot water connection 103 via the first pump C.

The branching 106 to the secondary hot water connection 103 can lie before or behind the mixing point 105, as it is not in operation during operation of the secondary hot water connection 103.

Further components are additional pumps inclusive auxiliary and accessory devices, auxiliary and accessory devices of the heat reservoirs A, armatures and valves V1 to V10, conduits, measuring and controlling devices, especially measuring devices for the temperature of the steam and water at different locations of the water-steam cycle.

A first mode of direct loading of the heat reservoir A with feed water is explained in conjunction with FIG. 3.

The valves V1, V2, V3, V4, V5, V11 and V13 are at least partially open. The valves V6, V7, V8, V9, V10 and V12 are closed.

In the unloaded condition the thermal reservoir A approximately has the temperature of the feed water behind feed pump 9. For loading feed water is conveyed from the cold water connection 101 via the first heat exchanger B and heats up. Then the hot feed water emits its heat to the heat reservoir A. Afterwards it is re-fed into the water-steam-cycle via the pump C and the secondary hot water connection 103. This means that the feed water on its way to the boiler is preheated by the high-pressure preheaters VW4 to VW6.

The first heat exchanger B is loaded with steam being tapped between steam separator (drum) of the steam generator 1 and the entry of the high pressure turbine HD. Thereby the electric output at the generator is reduced. The condensate of the first heat exchanger B is re-fed into the water-steam-cycle, e. g. into the condenser or re-fed into the preheater passage of the condensate line 19 via the pump 107 on an adequate temperature level.

The temperature of the heat reservoir A is adjusted to the maximally possible temperature, it approximately corresponds to the vaporization temperature of the heating steam pressure. Preferably the temperature of the heat reservoir A is adjusted to a range between 180° C. and 350° C., depending on the type of boiler. Supercritical boilers ma have even higher temperatures.

A second mode of direct loading of the heat reservoir A with feed water is explained in conjunction with FIG. 4.

It is alternatively possible to convey feed water steam through mixing conduit F in the opposite direction and thus mix already preheated feed water to the cold feed water.

Consequently also the valves V7, V8 and V13 are at least partially open. The valves V6, V9, V10, V11 and V12 are closed.

In this case the feed water quantity through the high-pressure preheaters VW4 to VW6 is larger than usual in this operating condition. This means that the amount of tapping steam is larger, too. In this case the first heat exchanger B may have smaller dimensions.

The unloading of the heat reservoir A with feed water is explained in conjunction with FIG. 5.

The valves V7, V8, V9, V10, V11 and V12 are at least partially open. The valves V1, V2, V3, and V13 are closed.

The feed water to be heated is tapped from the water-steam-cycle at the cold water connection 101 and heated in the heat reservoir A via the connecting line 21 and the first heat exchanger bypass D. Consequently the feed water streams through the heat reservoir A against the loading-direction. The heated feed water streams through the second heat exchanger bypass E and pump C through the second part 21.2 of the connecting line 21.

The achieved feed water temperature behind the heat reservoir A during unloading is named $T_{after\ heat\ reservoir}$.

Depending on the achieved feed water temperature $T_{after\ heat\ reservoir}$ the temperature of the feed water is adjusted/reduced with colder feed water being tapped at the cold water connection 101 or at the second mixing point 105 to the maximum feed water end temperature and re-fed to the condensate line 19 at the primary hot water connection 102.

It is to be understood that, although not shown in the drawing, it is also possible to refeed fluid into the condensate line 19 between preheaters VW4 and VW5 and/or between preheaters VW5 and VW6.

In case the hot feed water behind the heat reservoir A has a temperature lower than the temperature $T_{SpW,\ End}$ of the feed water after the last superheater or preheater VW6 it can be re-fed via the conduit H and the secondary hot water connection 103 into the condensate line 19 before the first high-pressure preheater VW4 ($T_{after\ heat\ reservoir} < T_{SpW,\ End}$).

It then mixes at 103 with feed water coming from the feed water container 8. As the mixing temperature at 103 is higher than the usual temperature at the entry of the first high-pressure preheater VW4 it draws of less tapping steam from the turbine 3 than during normal operation (without the heat reservoir A). Thus the electric output at the generator G increases.

For operational reasons a minimum quantity of feed water/tapping steam via the high-pressure preheaters VW 4 to VW6 is to be maintained.

Depending on the characteristic of the heat reservoir A the feed water outlet temperature $T_{after\ heat\ reservoir}$ either remains constant or constantly decreases. A decreasing temperature $T_{after\ heat\ reservoir}$ results in an increase of the tapping mass. The output steam generator 1 must then be correspondingly updated.

Figure 6:
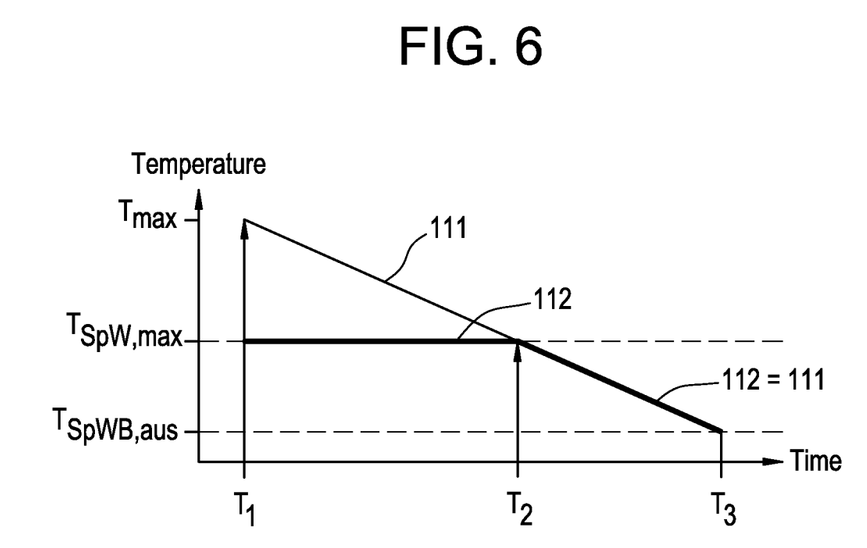

FIG. 6 shows a diagram showing the most relevant temperatures during unloading of the heat reservoir A.

In this diagram several abbreviations are used. Their meaning being as follows:

$T_{SpW,max}$: Maximum allowable temperature of the feed water at primary hot water connection 102

$T_{SpWB,uas}$: Temperature of the feed water after leaving the feed water container 8. This temperature can be measured for example at 101 or 103.

$M_{kaltes\ SpW}$: Mass flow [kg/s] of cold feed water extracted from the feed water container 8.

The X-axis of this diagram contains three Times T1, T2 and T3

At T1 the unloading of the heat reservoir A begins. At this time the heat reservoir A is fully loaded an has a high temperature that is approximately equal or somewhat higher than the temperature $T_{after\ heat\ reservoir}$ of the feed water after leaving the heat reservoir A.

The temperature $T_{after\ heat\ reservoir}$ is represented by the line 111 in FIG. 6.

The line 112 in FIG. 6 represents the temperature of the feed water after mixing. It is equal to the temperature of the feed water fed back to the water-steam-cycle at 102 or 103.

The temperature of the feed water at the primary mixing point 102 or before entering the steam generator 1 or an economiser Since the temperature $T_{after\ heat\ reservoir}$ is higher than the maximum allowable temperature $T_{SpW,max}$ of the feed water at primary hot water connection 102 it has to be mixed with relatively cold feed water from the feed water container 8.

The feed water from the feed water container 8 has the temperature $T_{SpWB,aus}$. At T1 approx. 1 kg of hot feed water having a temperature $T_{after\ heat\ reservoir}$ has to be mixed with approx. 1 kg of cold feed water having a temperature $T_{SpWB,\ aus}$ to obtain a mixing temperature $T_{SpW,max}$ at the mixing point 102.

As the unloading of the heat reservoir continues in the time period between T1 and T2 continues the temperature $T_{after\ heat\ reservoir}$ decreases (c. f. line 111), Thus the relation between the mass of hot feed water having a temperature $T_{after\ heat\ reservoir}$ that is to be mixed with cold feed water having a temperature $T_{SpWB,\ aus}$ changes continuously.

At T2 the temperature $T_{after\ heat\ reservoir}$ is equal to $T_{SpW,max}$ of and no cold feed water has to be added to obtain a mixing temperature TSpW,max at the mixing point 102.

By mixing the hot feed water from the heat reservoir A with cold feed water from the feed water steam generator 8 in the time period between T1 and T2 the temperature of the feed water at the primary mixing point 102 or before entering the steam generator 1 is kept constant (c. f. line 112 between T1 and T2).

In the time period between T2 and T3 the temperature $T_{after\ heat\ reservoir}$ of the feed water is below TSpW,max and thus no cold feed water is added. Since 102 is not in operation all water is fed back via 103. This means that the temperature of the feed water after storage is equal to the temperature of the fed back feed water.

Figure 7:
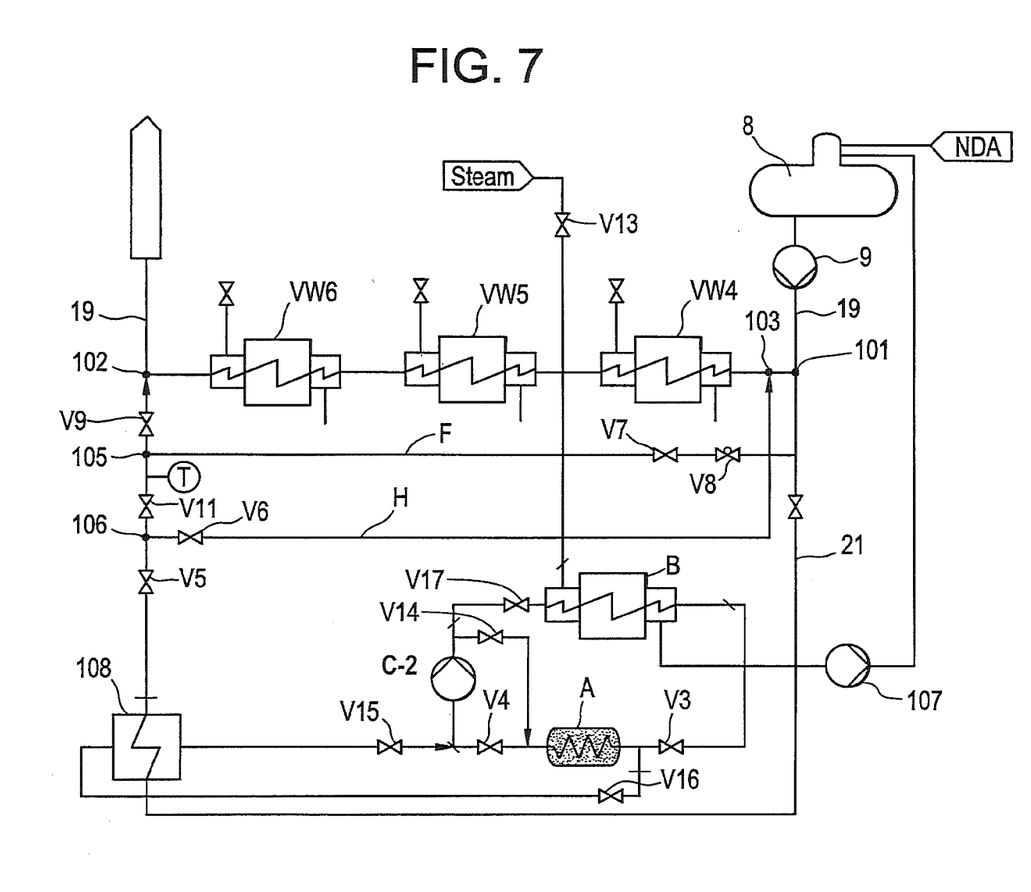
Figure 8:
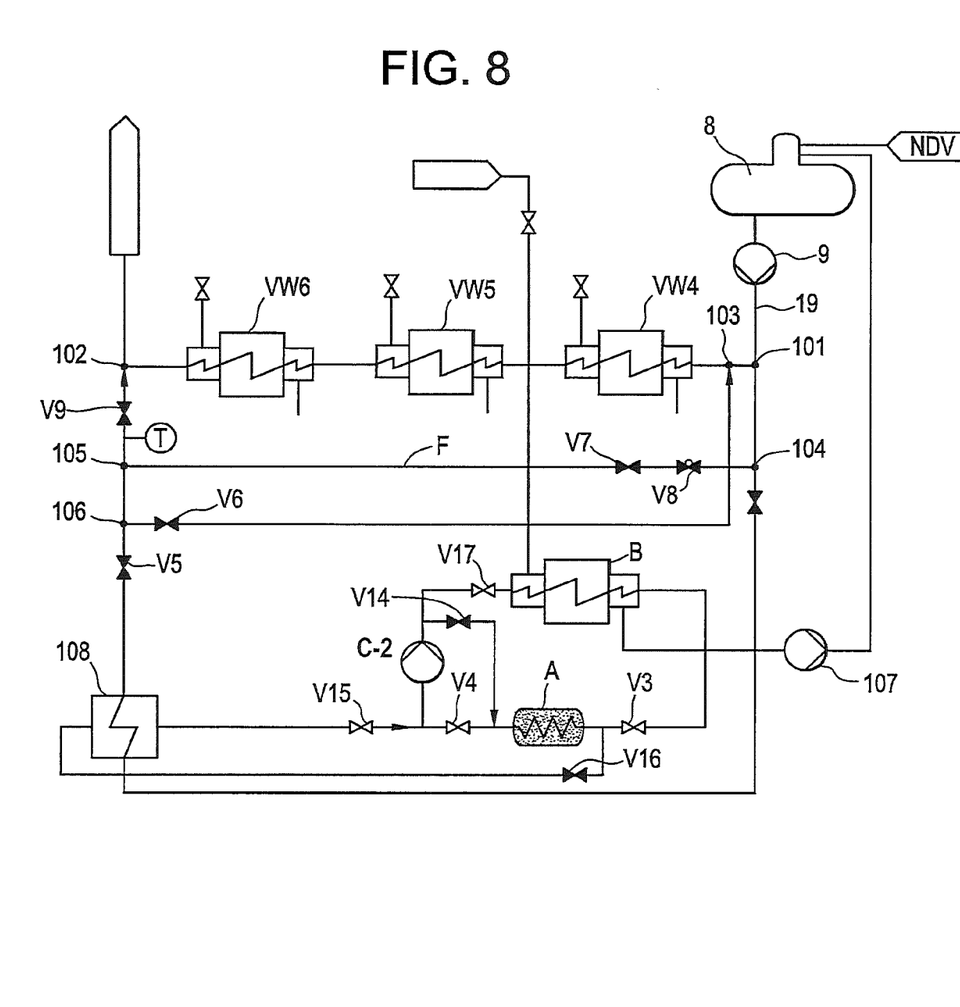
Figure 9:
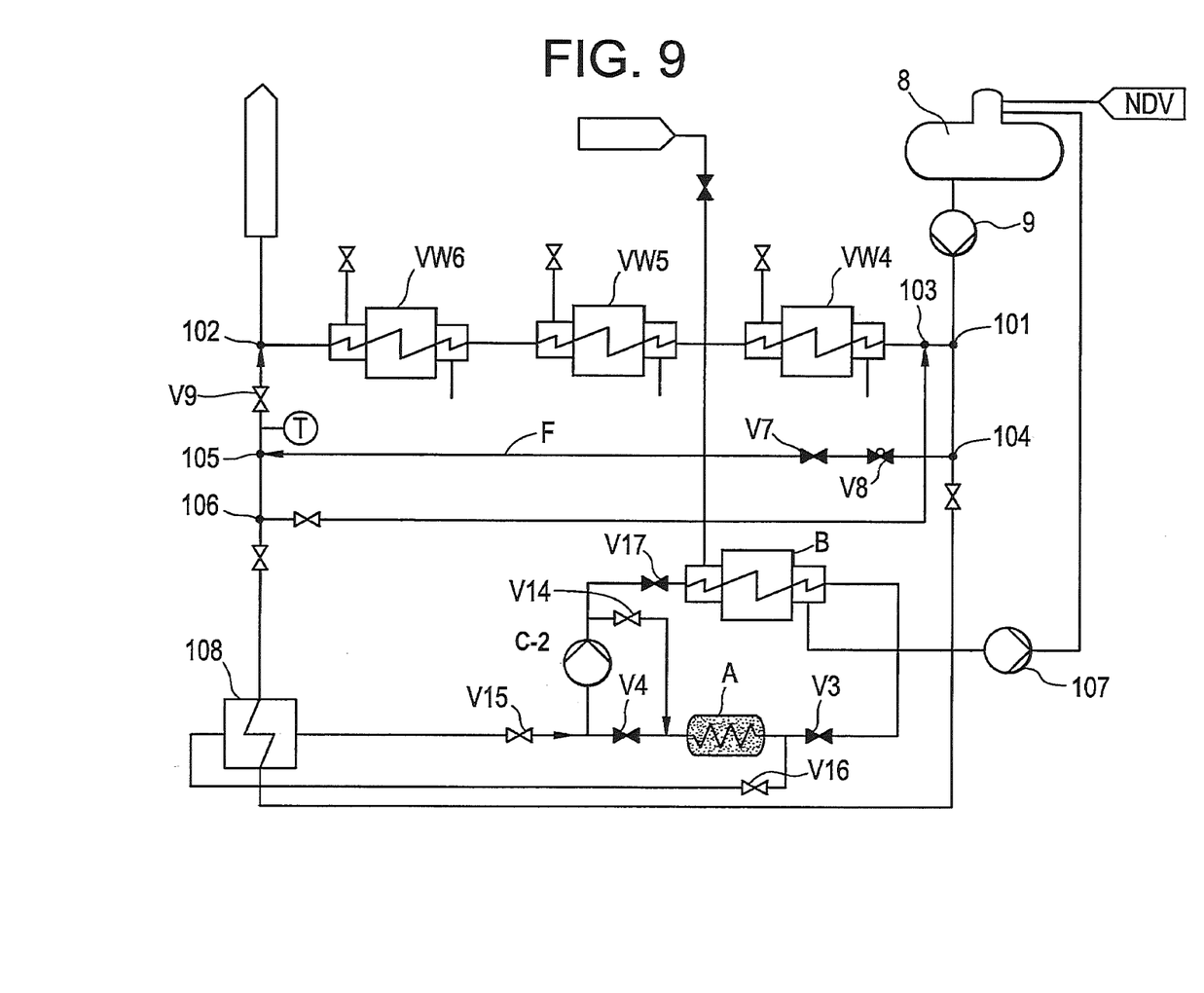

This means that the temperature $T_{after\ heat\ reservoir}$ (c. f. line 111) and the temperature of the feed water at the primary mixing point 102 or before entering the steam generator 1 or an economiser (c. f. line 112) are identical FIGS. 7 to 9 show a second embodiment of the claimed invention. In this embodiment the heat reservoir A is connected to the first heat exchanger B and a second heat exchanger 108 by means of an additional heat transfer circuit with a second heat carrier medium like thermo oil or the like.

The thermal reservoir A is loaded with the heat carrier medium and not feed water.

The first heat exchanger B is a steam-heat carrier medium-heat exchanger and the second heat exchanger 108 is a heat carrier medium-feed water-heat exchanger.

The additional heat transfer circuit comprises two sub-circuits, a first one for loading and a second one for unloading the thermal reservoir A.

The first sub-circuit comprises the first heat exchanger B, the thermal reservoir A and a recirculation pump C-2 plus some conduits and valves, namely V3, V4 and V17. The second heat exchanger 108 is arranged in the bypass to the first sub-circuit.

The second sub-circuit comprises the second heat exchanger 108, the thermal reservoir A and the recirculation pump C-2 plus some conduits and valves, namely V4,V15 and V16. The first heat exchanger B is arranged in the bypass to the second sub-circuit. In this cycle the heat to be stored out is emitted to the reservoir via the heat carrier medium.

FIG. 8 shows the loading of the heat reservoir A using the first sub-circuit. The valves V3, V4 and V17 are at least partially open, whereas the valves V4,V15 and V16 are closed. By running the pump C-2 a heat transfer from the first heat exchanger B to the heat reservoir A takes place.

FIG. 9 shows the unloading of the heat reservoir A using the second sub-circuit. The valves V3, V4 and V17 are closed, whereas the valves V4,V15 and V16 are at least partially open. By running the pump C-2 a heat transfer from the heat reservoir A top the first heat exchanger to the second heat exchanger 108 takes place.

Since the second heat exchanger 108 is connected to the connecting line 21 the control of the unloading of the heat reservoir A is similar to the first embodiment. For this reason it is referred to FIG. 6.

The invention claimed is:

1. A steam power plant comprising:
   a steam generator to produce steam,
   a turbine powered by the steam,
   a condenser to cool steam from the turbine to produce feed water,
   a feed water container receiving the feed water,
   at least one high-pressure preheater to heat the feed water from the feed water container,
   a first condensate line circulating the feed water from the feed water container through the at least one high-pressure preheater to the steam generator,
   a second condensate line disposed fluidly in parallel with the at least one high-pressure preheater to bypass at least a portion of the feed water around the at least one high-pressure preheater, the second condensate line including a first heat exchanger to heat a fluid, and
   a heat reservoir fluidly coupled in series with the first heat exchanger to store the fluid heated by the first heat exchanger,
   wherein the first heat exchanger is thermally coupled to the second condensate line to heat the at least a portion of the feed water passing through the second condensate line; and
   wherein the first heat exchanger is supplied with live steam from the steam generator and the live steam from the steam generator is extracted upstream of the turbine.

2. The steam power plant according to claim 1, wherein the first heat exchanger is fluidly coupled to the steam generator to provide steam directly to the first heat exchanger to heat the fluid passing through the first heat exchanger.

3. The steam power plant according to claim 2, wherein the first heat exchanger is fluidly coupled to the feed water container, wherein the first heat exchanger cools the steam provided from the steam generator to the feed water container.

4. The steam power plant according to according to claim 1, further comprising a third condensate line fluidly disposed in parallel to the at least one high-pressure preheater.

5. The steam power plant according to claim 1, further comprising a pump fluidly coupled to the second condensate line.

6. The steam power plant according to claim 1, further comprising a first bypass line fluidly coupled in parallel to the heat reservoir and the first heat exchanger and fluidly coupled to the second condensate line.

7. The steam power plant according to claim 6, further comprising a second bypass line fluidly coupled in parallel to the heat reservoir, fluidly coupled in series to the first heat exchanger, and fluidly coupled to the second condensate line.

8. The steam power plant according to claim 7, further comprising:
   a flow control valve fluidly coupled in one or more of the following configurations:
      between the feed water container and the first heat exchanger,
      between the first heat exchanger and the heat reservoir,
      between the heat reservoir and the steam generator,
      in the first bypass-line,
      in the second bypass-line, and
      in a third condensate line fluidly disposed in parallel to the at least one high-pressure preheater.

9. The steam power plant according to claim 1, wherein the heat reservoir is pressureless and uses solid materials to store thermal energy therein.

10. The steam power plant according to claim 1, wherein the heat reservoir is a concrete reservoir.

11. The steam power plant according to claim 1, wherein the operating temperature of the heat reservoir is higher than a temperature of the feed water from the feed water container.

12. The steam power plant according to claim 1, wherein the first heat exchanger is a condensation heat exchanger with a desuperheater and a subcooler.

13. The steam power plant according to claim 12, wherein the desuperheater is supplied with the live steam.

14. The steam power plant according to claim 12, wherein the subcooler is connected to the feed water container through a pump.

* * * * *